JOSEPH RONALD MORTLOCK
KENNETH JAMES RAWCLIFFE WILKINSON
PHILIP RICHARDSON

By: *Miles D. Pillars*
Attorney

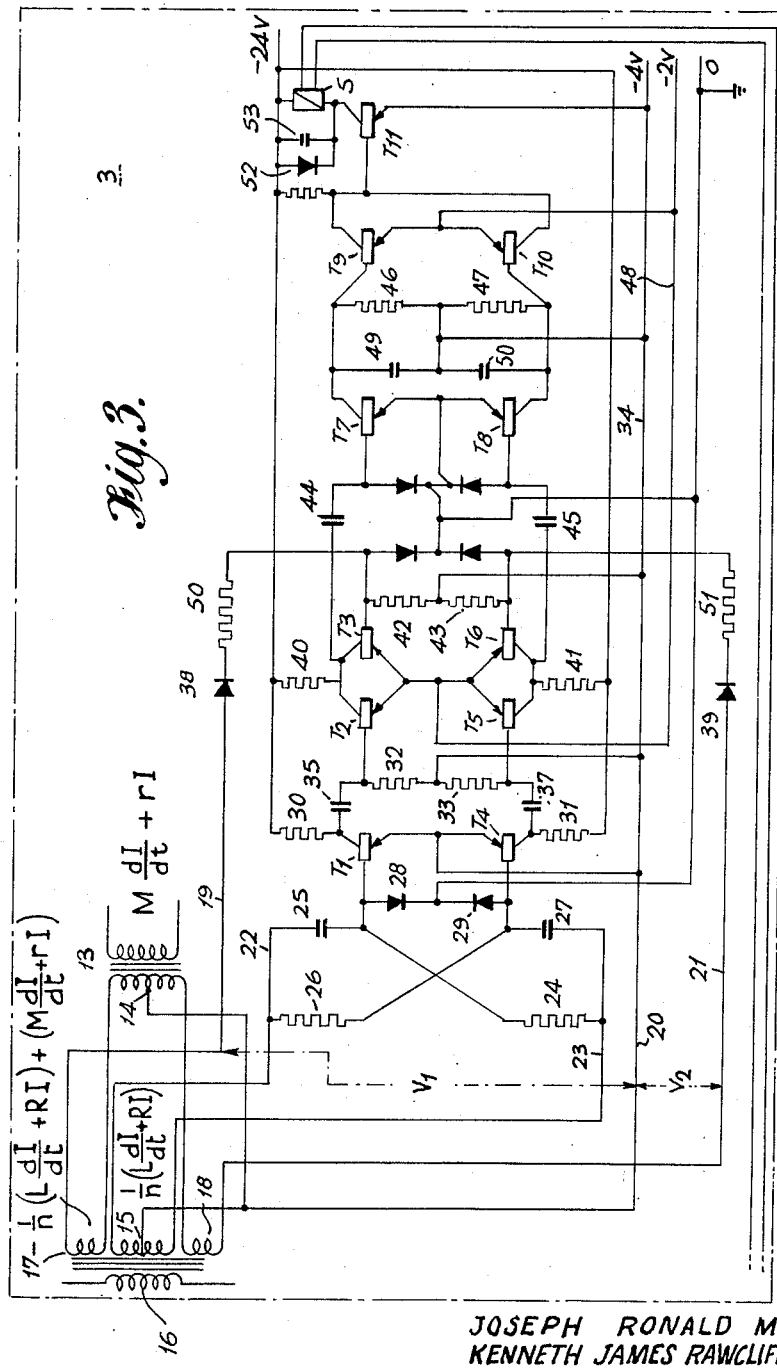

3,099,775
Patented July 30, 1963

1

3,099,775
IMPEDANCE PROTECTIVE SYSTEMS
Joseph Ronald Mortlock, Kenton, and Kenneth James Rawcliffe Wilkinson and Philip Richardson, Rugby, England, assignors to Associated Electrical Industries (Rugby) Limited, a company of Great Britain
Filed Aug. 31, 1959, Ser. No. 837,223
Claims priority, application Great Britain Sept. 3, 1958
7 Claims. (Cl. 317—36)

This invention relates to distance protective systems for alternating current electric circuits.

Distance relays used in such systems are required to operate to trip a circuit breaker and isolate a section of a faulty circuit when the ratio of the current in the circuit to the voltage on the circuit exceeds a predetermined value, indicating the presence of a fault within a predetermined distance of the location of the relay and representing the protected section. If the relay is not to operate for faults lying only just outside the section, this requires an accurate comparison of the current and voltage involved. In faulty conditions the current flowing to the fault is liable to possess a D.C. component. Current transformers usually employed to derive the current component required for supply to such distance relays do not, however, accurately reproduce in the secondary winding the fault current when a D.C. component is present in the primary winding. This is because the secondary winding of a current transformer cannot compensate, for a sufficient number of half cycles, the very large D.C. component or off-set present in the primary winding, so that appreciable errors are necessarily present in the secondary winding when the primary current off-set occurs.

According to the invention, distance to a fault is determined by comparing the peak value of line voltage with a peak value of a voltage derived in the secondary of a mutual inductance M whose primary carries the fault current $I$ and the trip coil of a circuit breaker is operated when the comparison indicates that a fault is present within the protected section. Additionally, the voltage derived from the mutual inductance may be modified by a component proportional to the resistance R of the section of line under protection in a manner described hereinafter.

Figure 1:
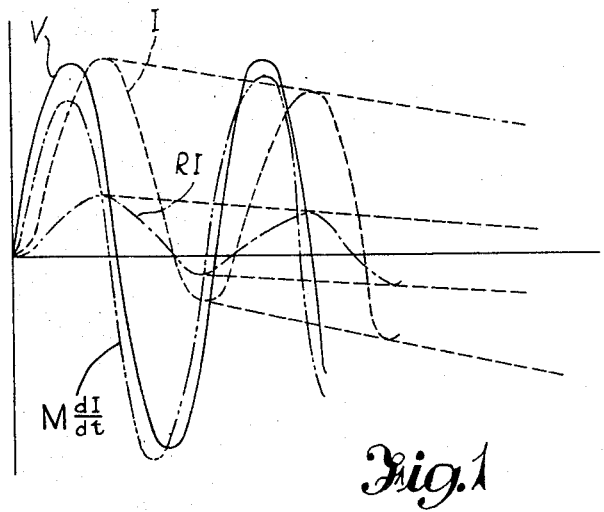
Figure 2:
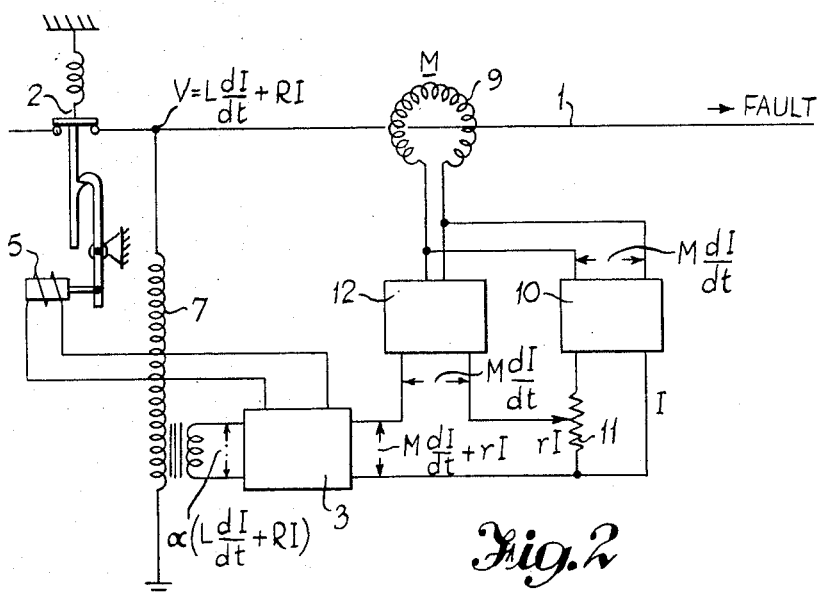

In the accompanying drawings, FIG. 1 is a graphical representation of the circuit current and voltage relations when a fault is present in the circuit; FIG. 2 shows diagrammatically a protective arrangement according to the invention as applied to the single phase of an alternating current circuit; and FIG. 3 shows a circuit arrangement which may be employed in a part of the protective arrangement shown in FIG. 1.

Considering the case of a fault to earth, voltage V at the location of the relay is:

$$L\frac{dI}{dt} + RI$$

where L is the inductive reactance and R the resistance of the section of the circuit lying between the relay location and the fault, and $I$ is the instantaneous fault current in the circuit. Where the RI term is small and its peak value can be neglected, it is sufficient to compare the peak values of the secondary voltage $$M\frac{dI}{dt}$$

derived from the mutual inductance with peak values of the circuit voltage. This may be done in an electronic circuit made directionally sensitive so that it responds only to faults in the desired direction. The electronic circuit is then so biased, or pre-set, that no operation of

2 a protection relay associated with it occurs unless the $$M\frac{dI}{dt}$$

voltage exceeds a predetermined fraction of the circuit voltage $$\left(\text{or } L\frac{dI}{dt}\right)$$

It is important in distance protection schemes to achieve high accuracy at the greatest distance of protection, particularly where circuit resistance (for resistance afforded by the fault-arc itself can be excluded in high voltage systems) is an appreciable fraction of the total fault impedance. Under these conditions, as shown in FIG. 1 the first two cycles of a fully off-set current fault $I$ are indicated, together with the corresponding voltages $$L\frac{dI}{dt}$$

and RI which when added together, constitute the line voltage V.

It will be apparent that $$M\frac{dI}{dt}$$

must reproduce, to an appropriate scale depending upon the relative values of L, M and amplifier constants, the curve $$L\frac{dI}{dt}$$

To allow accurate assessment to be made of fault distances near the far end of the protected section where R is an appreciable fraction of the line impedance, it is accordingly desirable to add to the voltage $$M\frac{dI}{dt}$$

a fraction $rI$ corresponding to the line resistance component RI at the limit of the section under protection. The manner in which this is effected is shown in FIG. 2 of the drawings. The section of the circuit to be protected is indicated at 1. It is terminated at one end by a circuit breaker 2 the control of which is effected by a directionally sensitive relay 3 which controls the energisation of a trip coil 5 associated with the circuit breaker 2.

The relay 3 is energised by a voltage proportional to $$\left(L\frac{dI}{dt} + RI\right)$$

obtained for example, from a voltage transformer 7 the primary winding of which is connected between the circuit 1 and earth, and by a voltage proportional to $$M\frac{dI}{dt} + rI$$

the trip coil 5 being energised only when $$M\frac{dI}{dt} + rI$$

is greater than $$L\frac{dI}{dt} + RI$$

The component $$M\frac{dI}{dt} + rI$$

is obtained from a mutual inductance 9 of which the primary winding is constituted by the circuit conductor 1. The mutual inductance may consist of a toroidal winding surrounding the conductor 1, the turns of the winding being insulated from one another and also insulated by air from the conductor 1. The voltage obtained from mutual inductance 9 is amplified by amplifier 10 to give an output current accurately proportional to I. Since the input to the amplifier 10 is not a voltage proportional to the circuit current but to $$M\frac{dI}{dt}$$

the amplifier must be preceded by an intergrating circuit comprising a series resistance and a shunt capacitor, the voltage across which serves as the input to the amplifier. This circuitry is indicated generally as amplifier 10, and since it represents well-known art no specific description of the circuitry is deemed to be necessary. It may be preferable to obtain the output voltage proportional to the circuit current by way of an amplifier with quadrature feed-back. The output current from amplifier 10 is passed through resistance 11 from which is obtained a voltage component proportional to $rI$.

The voltage obtained from mutual inductor 9 is also amplified in known manner by a main amplifier 12 to obtain an output voltage proportional to $$M\frac{dI}{dt}$$

The output from amplifiers 10 and 12 are now added to form the second input to the directional relay 3 which is proportional to $$M\frac{dI}{dt}+RI$$

The comparison of the voltage output from amplifiers 10 and 12 with the circuit voltage obtained from transformer 7 is effected by the circuit indicated at 3 in FIG. 2, and now to be described with reference to FIG. 3.

The voltage proportional to $$M\frac{dI}{dt}+rI$$

obtained from amplifiers 12 and 10, is applied to the primary winding of a transformer 13, the secondary winding of which is centre-tapped at 14. Centre-tap 14 is connected to the centre-tap 15 of a secondary winding of an auxiliary transformer 16, the primary winding of which is energised from the secondary winding of transformer 7 shown in FIG. 2. The use of an auxiliary transformer is desirable since the transformer 7 is normally an existing component of the power circuit. Auxiliary transformer 16 also has two secondary windings 17, 18. Secondary winding 17 has one terminal connected to one end of the secondary winding of transformer 13 and its other terminal connected to lead 19. The centre-tap 15 is connected to lead 20. The other end of secondary winding of transformer 13 is connected to one terminal of the secondary winding 18 of transformer 16, while the other terminal of secondary winding 18 is connected to lead 21.

By these connections, the voltage $v_1$ between leads 19 and 20 is made proportional to the quantity $$-\frac{1}{n}\left(L\frac{dI}{dt}+RI\right)+\left(M\frac{dI}{dt}+rI\right)$$

which quantity, during alternate half-cycles, becomes positive when the line 1 is grounded through an impedance less than the impedance of the section of the line under protection when that section is healthy, i.e. under fault conditions. Similarly, the voltage $v_2$ between leads 20 and 21 is made proportional to the same quantity during the intervening half-cycles.

The terminals of the centre-tapped secondary winding of auxiliary transformer 17 are connected to leads 22, 23. The voltage which appears between leads 23, 20 and between 22, 20, are proportional to the line voltage, and in fixed phase relationship thereto. These voltages are applied through phase shifting networks consisting of resistor 24 and capacitor 25, and resistor 26 and capacitor 27 to the base electrodes of transistors $T_1$ and $T_4$, respectively. Rectifiers 28, 29 are provided to protect the transistors by preventing their base electrodes from being driven positively beyond their breakdown voltage to the emitter electrodes. The supply resistors 30 and 31 are sufficiently large to ensure that the transistors run with their collectors virtually at emitter potential when the potential applied to the base is at all negative, so the waveform at the collectors is square.

Transistors $T_2$ and $T_5$ have a negative bias applied to their bases by connection through resistors 32, 33, respectively to the negative voltage line 34. At the onset of each conduction period of $T_1$ and $T_4$, the positive going front of the square wave on the collector is differentiated by capacitor 35 and resistor 32, and by capacitor 37 and resistor 33, respectively, giving positive pulses which turn $T_2$ and $T_5$ off. The time constants of capacitor 35 and resistor 32, and capacitor 37 and resistor 33 are such as to give a pulse length of 1/6 of a cycle of the alternating voltage on the circuit 1 and the phase shifting networks consisting of capacitor 25 and resistor 24 and capacitor 27 and resistor 26 are such as to position the pulse symmetrically about the times of voltage maxima in their respective half-cycles.

The combined inputs from the amplifiers 10 and 12 and the transformer 7 is applied by leads 19 and 21 to the diodes 38 and 39, respectively. If the input from the amplifiers is greater than that from the voltage transformer, the resultant signal will be positive and will turn off transistors $T_3$ and $T_6$ which are connected to transistors $T_2$ and $T_5$, as shown. For the relay to operate, the requirement is that this shall happen during the positive voltage peaks, at which points $T_2$ and $T_5$ are also turned off. The base electrodes of transistors $T_3$ and $T_6$ are also connected to negative line 34 by way of resistors 42, 43, respectively. The collector resistors 40, 41 of transistors $T_2$, $T_5$, and $T_3$, $T_6$, respectively, are sufficiently large to ensure that when either of the transistors connected to them is conducting, the collector potential is substantially equal to the emitter potential, and is unable to reach the supply line voltage until both transistors $T_2$ and $T_3$, or transistors $T_5$ and $T_6$ are cut off. When this occurs, negative going pulses are applied through capacitors 44 and 45 to the base electrodes of transistors $T_7$ and $T_8$, respectively, during alternate half-cycles of the supply voltage. The collectors of transistors $T_7$ and $T_8$ are directly coupled to the base electrodes of transistors $T_9$ and $T_{10}$, which base electrodes are connected through resistors 46, 47, respectively, to the negative voltage supply line 34. The emitters of transistors $T_9$ and $T_{10}$ are returned to the negative voltage supply line 48 which is at a positive potential with respect to line 34; this ensures that transistors $T_9$ and $T_{10}$ remain conducting until transistors $T_7$ or $T_8$ are made to conduct by pulses through capacitors 44, 45. When this happens, the base potentials of transistors $T_9$ and $T_{10}$ fall to approximately zero volts and only return to the voltage of line 34 when capacitors 49, 50 recharge through resistors 46, 47, respectively. The time constants of capacitor 49 and resistor 46, and of capacitor 50 and resistor 47 are made such that transistors $T_9$ and $T_{10}$ are cut off for one cycle on receipt of a pulse through transistors $T_7$ and $T_8$, respectively. Under fault conditions this ensures that transistors $T_9$ and $T_{10}$ are continuously turned off, allowing their collectors, which are tied to the base electrode of a further transistor $T_{11}$ to go more negative than line 48. Transistor $T_{11}$ then becomes conductive and energises the trip coil 5.

In the event of a fault occurring on the circuit in the zone behind the relay, the voltage inputs to leads 19, 21, corresponding to the current and voltage on the circuit, add instead of subtracting. Resistors 50 and 51 in series with diodes 38, 39, respectively, are provided to limit the current to a safe value. The trip coil 5 is not then energised because the phasing of the voltage reference input to transistors $T_1$ and $T_4$ is reversed with respect to the input on leads 19 and 21, and there is no coincidence of the turning off pulses in transistors $T_2$ and $T_3$, or $T_5$ and $T_6$.

Under transient conditions, the current waveform is asymmetrical, and a tripping signal will occur during alternate half cycles when the fault is just outside the protected zone. The trip coil will not be energised as transistors $T_9$ and $T_{10}$ will not both be turned off together.

The trip coil will be energised when fault signals are received in two successive half-cycles and will likewise clear as soon as the fault signal is missing in any half cycle; allowing for the fault occurring immediately after a voltage peak, the maximum operating time is 1.5 cycles. The clearing time is also 1.5 cycles maximum.

Diode 52 and capacitor 53 are provided to protect transistor $T_{11}$ from the inductive effect of the trip coil 5 when it is de-energised.

The circuit arrangement illustrated in FIG. 3 is only one arrangement which could be employed to effect energisation of the trip coil. It is aimed to cover by the appended claims such modifications as fall within the scope thereof.

The arrangement shown is simplified by indicating its application only to a single phase circuit; to allow for its application to polyphase circuits, the apparatus will be suitably reproduced for each phase. To allow for the protection against line-to-line faults, the plurality of voltage sensing elements are connected between phases.

What we claim is:

1. An impedance protective arrangement for a circuit connected to a source of alternating current comprising means for producing a first alternating voltage proportional to the voltage in said circuit, a mutual inductance associated with said circuit and having a primary winding carrying the current in said circuit, means for obtaining from the secondary winding of said mutual inductance a second alternating voltage proportional to the current in said circuit, means for obtaining from the secondary winding of said mutual inductance a third alternating voltage proportional to the resistance of said circuit, means for obtaining the vectorial difference between the sum of said second and third voltages and said first voltage, means for comparing in corresponding alternate half-cycles said first voltage with said vectorial difference, a protective device adapted to disconnect said circuit from said source, and means for energizing said protective device when, in successive half-cycles, said vector difference reverses in phase with reference to said first voltage as compared with its phase with reference to said first voltage when said circuit is healthy.

2. An impedance protective arrangement for a circuit connected to a source of alternating current, comprising a transformer having a primary winding energized by the voltage of said circuit and a plurality of secondary windings, a linear mutual inductance M having no magnetic core associated with said circuit and having a primary winding carrying the current in said circuit, means for obtaining from the secondary winding of said mutual inductance an output voltage proportional to $$M\frac{dI}{dt}$$

(where I is the current in said circuit), an integrating circuit through which said output voltage is passed, an amplifier adapted to produce an output current proportional to the voltage obtained from said integrating circuit, a resistance through which output current from said amplifier is passed, circuit means for adding an output voltage $$M\frac{dI}{dt}$$

from said linear mutual inductance to the voltage across said resistance to produce a voltage sum proportional to $$M\frac{dI}{dt}+rI$$

means for deriving from said voltage sum and from secondary windings of said transformer control voltages which, in alternate half-cycles of said supply, are proportional to the vector difference $$-\frac{1}{n}\left(L\frac{dI}{dt}+RI\right)+\left(M\frac{dI}{dt}+rI\right)$$

(where L is the inductance and R is the resistance of said circuit and $$r=R\frac{M}{L}\right)$$

and are of opposite phase, circuit means to which voltages obtained from a secondary winding of said transformer and proportional to $$\frac{1}{n}\left(L\frac{dI}{dt}+RI\right)$$

are applied in successive half-cycles to produce pulse voltages displaced by 90° from said circuit voltage, means for superimposing said control voltages on said pulse voltages in said circuit means, a protective device operable to disconnect said circuit from said source of supply, and means for controlling the energization of said protective device from said circuit means, said protective device being energized when, in successive half-cycles, said vector difference reverses in phase with reference to said pulse voltages.

3. An impedance protective arrangement according to claim 1, in which said mutual inductance consists of a toroidal winding surrounding a conductor of said circuit, the turns of said winding being insulated from one another and insulated from said conductor and having no magnetic material associated therewith.

4. An impedance protective circuit arrangement according to claim 2, in which said control voltages are applied to said circuit means through unidirectionally conductive devices which limit the voltage applied to said circuit means in the event that fault conditions occur on the supply side of said circuit.

5. An impedance protective arrangement according to claim 2, in which said circuit means comprises a pair of transistors energized by opposite half-cycles of a voltage proportional to the voltage in said circuit, means for modifying the output from said pair of transistors into pulse form voltages, a second pair of transistors supplied with said pulse form voltages in opposite half-cycles, a third pair of transistors to which opposite half-cycles of said control voltages are applied, said third pair of transistors being connected symmetrically to said second pair of transistors, a further pair of transistors connected to be maintained in a conductive condition by respective opposite half-cycles of the combined output from said second and said third pair of transistors when the phase relation between said control and said pulse voltages corresponds with healthy conditions on said circuit, and an output transistor connected to said protective relay to cause said relay to be energized when said output transistor is rendered conductive, said output transistor being operatively connected to said further pair of transistors to be rendered conductive only when, in successive half-cycles, both of said pair of further transistors is rendered nonconductive.

6. An impedance type distance protective arrangement for an alternating current circuit connected to a source of supply comprising means for deriving from the rate-of-change of current in said circuit in-phase component voltages proportional, respectively, to the rate-of-change of circuit current and to the voltage on said circuit, means for producing a vector difference of said component voltages, means for producing a further voltage directly proportional to the voltage on said circuit, and means for comparing, in successive half-cycles said vector difference with said further voltage, a protective relay operable to disconnect said circuit from said source of supply, and means for operating said protective relay when, in successive half-cycles, said vector difference reverses in phase with reference to said further voltage as compared with its phase with reference to said further voltage when said circuit is healthy.

7. An impedance type distance protective arrangement for an alternating current circuit connected to a source of supply comprising means for deriving from said circuit a first alternating voltage proportional to the circuit voltage $$L\frac{dI}{dt}+RI$$

(where L is the inductance and R is the resistance of said circuit and I is the current in said circuit), means for producing from said first alternating voltage pulse voltages of alternate opposite sign displaced in phase from said circuit voltage, a linear mutual inductance M having no magnetic material associated therewith and having a primary winding carrying the circuit current, means for obtaining from the secondary windings of said mutual inductance a voltage component proportional to $$M\frac{dI}{dt}+rI \left(\text{where } r=R\frac{M}{L}\right)$$

means for providing an alternate voltage proportional to the vector difference between $$L=\frac{dI}{dt}+RI \text{ and } M\frac{dI}{dt}+rI$$

means for comparing, in respective opposite half-cycles, the vector difference voltage and said pulse voltages, a protective relay operable to disconnect said circuit from said source of supply, and means for operating said protective relay when, in successive half-cycles, the phase relation between said vector difference voltage and said pulse voltages changes in a sense indicative of the presence of a fault on said circuit.

References Cited in the file of this patent

UNITED STATES PATENTS

| | | |
|---|---|---|
| 2,201,829 | Heinrich | May 21, 1940 |
| 2,241,127 | Harder | May 6, 1941 |
| 2,425,759 | Sonnemann | Aug. 19, 1947 |
| 2,426,062 | Sonnemann | Aug. 19, 1947 |
| 2,542,809 | Goldsborough | Feb. 20, 1951 |
| 2,714,702 | Shockley | Aug. 2, 1955 |
| 2,845,581 | Hodges | July 29, 1958 |
| 2,912,622 | Warrington | Nov. 10, 1959 |